J. E. KAPTEINA.
METHOD OF HANDLING GLASS.
APPLICATION FILED MAR. 31, 1913.
1,107,528.
Patented Aug. 18, 1914.
2 SHEETS—SHEET 1.
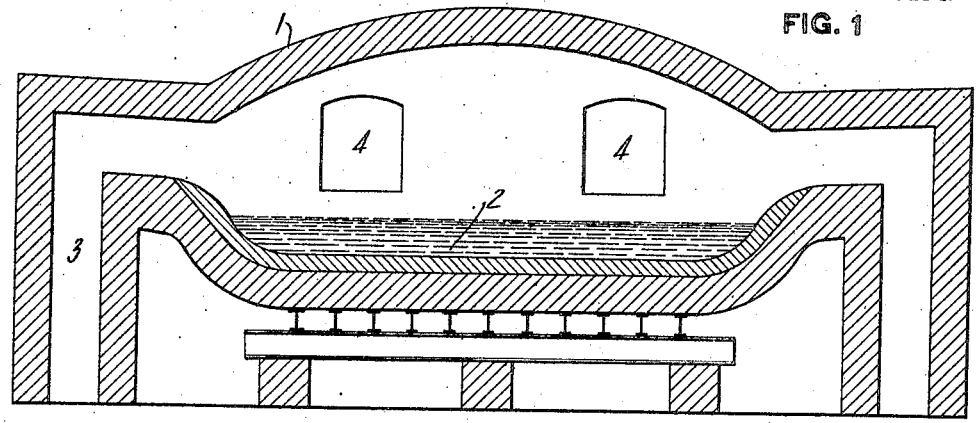
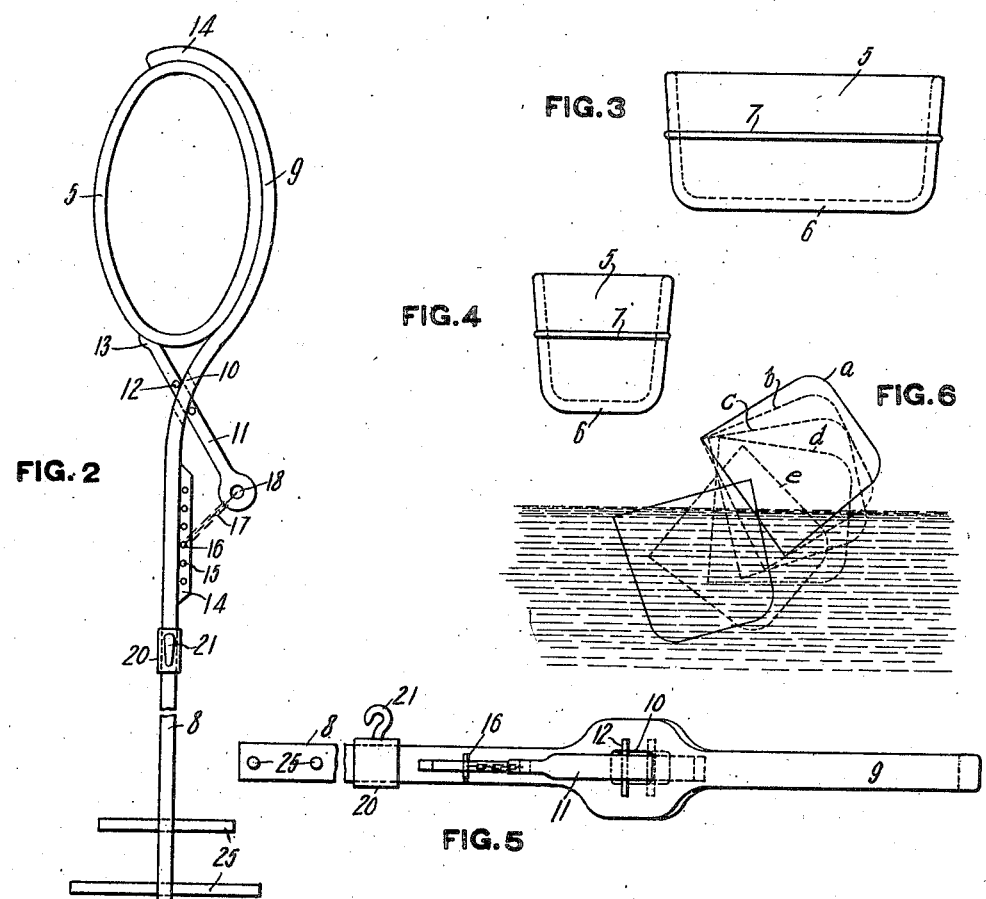
WITNESSES
INVENTOR J. E. KAPTEINA.
METHOD OF HANDLING GLASS.
APPLICATION FILED MAR. 31, 1913.
1,107,528.
Patented Aug. 18, 1914.
2 SHEETS—SHEET 2.
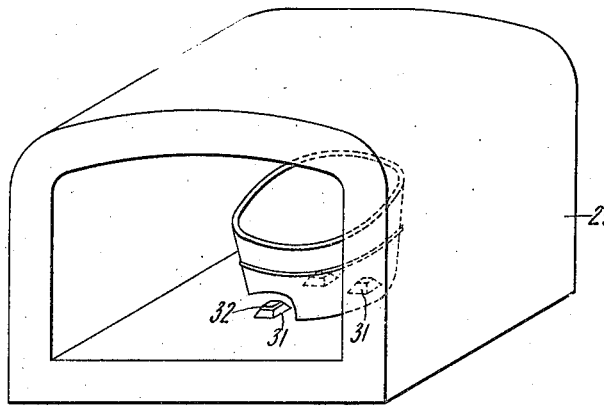
FIG. 7
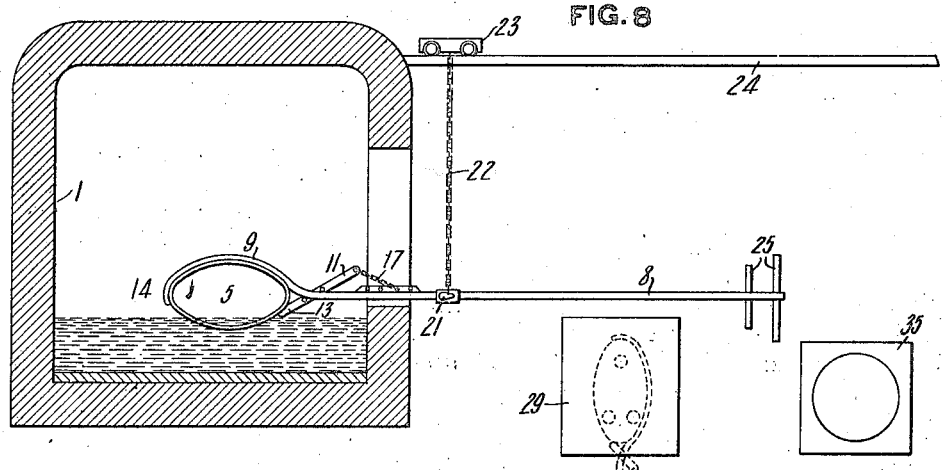
FIG. 8
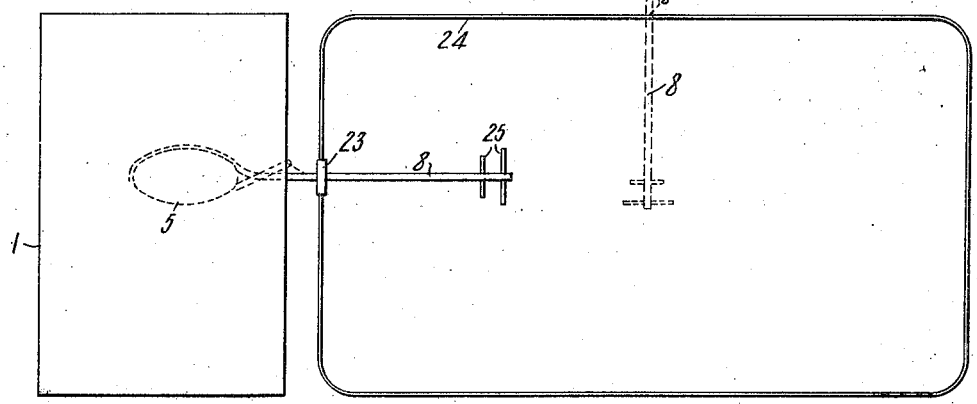
FIG. 9
WITNESSES
INVENTOR

UNITED STATES PATENT OFFICE.

JOHN E. KAPTEINA, OF SPRINGDALE, PENNSYLVANIA.

METHOD OF HANDLING GLASS.

1,107,528.   Specification of Letters Patent.   Patented Aug. 18, 1914.

Application filed March 31, 1913. Serial No. 757,399.

*To all whom it may concern:*

Be it known that I, JOHN E. KAPTEINA, a resident of Springdale, in the county of Allegheny and State of Pennsylvania, have invented a new and useful Improvement in Methods of Handling Glass, of which the following is a specification.

This invention relates to a method of handling molten glass for the production of glass articles, and particularly for the production of plate-glass. In the production of plate-glass it has been the practice for many years past to melt down the ingredients to form the molten glass in pots formed of refractory materials, which pots, with the raw materials therein, are laid on the floor of a suitable heating furnace. When the materials have been melted down the pot containing the same is removed from the melting furnace and the molten glass cast or poured upon the table. It has also been proposed to melt the raw materials in a tank or large vessel, or on the hearth of a furnace of large capacity, from which batches of the material may be withdrawn through a tap-hole into pots, from which it is cast or poured either into other pots or directly upon the table. In some cases said pots have been mounted upon a rotary table in front of the glass melting furnace so the several pots can be successively brought into registration with the tap-hole and filled.

When the materials are melted down directly in the pot the cost of production is excessively high, due to the expense of keeping up the temperature of a heating furnace large enough to receive a number of pots, and the waste of heat units necessarily involved in heating by such an uneconomical method. The labor cost is also high, due to the number of times the material must be handled in placing it in and removing it from the furnaces and conveying it to the table. In those cases where attempts have been made to melt down and keep in reserve a large quantity of molten glass from which batches are withdrawn, it is found in practice that it is difficult, if not actually impossible, to produce plate-glass without flaws. When molten glass is discharged from a furnace tap-hole in a stream and allowed to flow or fall into the pot, it unavoidably traps some air in the mass of molten glass, forming air bubbles which it is practically impossible to work out, and thereby producing a defective plate. Also, in falling, the molten glass "hairs" or strings out and is chilled or cooled so that it either breaks and becomes brittle in spots or is of non-homogeneous texture, whereby internal strains or stresses are set up when the glass cools, thereby making the plate worthless. The same results are produced when molten glass is poured from one pot into another. Another important factor in the high cost of plate-glass today is the breakage of the pots. These are made of refractory materials, such as fire-clay, or the like, and are comparatively expensive. In the ordinary methods of handling glass, the pots are frequently broken, due to the large number of times they must be picked up and set down, and the frequent wide variation of temperature they are subjected to. In fact, an ordinary pot used in the common methods of handling glass, has a life of only one or two months.

My invention is designed to do away with the foregoing objections and to provide a method of handling molten glass, and particularly for the production of plate-glass, whereby the cost of labor and the expense of heating is greatly reduced, and whereby the life of the pots is greatly increased.

A further object of the invention is to provide a method of handling glass, wherein a large quantity of glass can be melted down in a single vessel, tank or furnace, of relatively large capacity, from which batches of molten glass of the proper quantity may be withdrawn and cast or poured to form the plate.

In the drawings, which represent somewhat diagrammatically apparatus suitable for carrying out the method, Figure 1 is a longitudinal sectional elevation through the melting furnace; Fig. 2 is a plan view of one of the melting pots, and showing a pair of tongs for holding and transporting the same; Fig. 3 is a side elevation of one of the pots; Fig. 4 is an end elevation of the same; Fig. 5 is an elevation, from the right in Fig. 2, of the tongs; Fig. 6 is a diagrammatic view, showing the dipping or ladling step; Fig. 7 is a perspective view of the tempering furnace; Fig. 8 is a cross sectional view of the melting furnace, showing a pot being filled; and Fig. 9 is a diagrammatic view of the entire apparatus.

According to my improved method, the raw materials to form the glass are first melted down in a large tank or vessel, or on the hearth of a furnace of large capacity. Said furnace is provided with doors or "glory holes", through which access to the interior may be had. The molten glass is removed from the furnace by means of pots or ladles which preferably are oval in plan view. In carrying out the method, said pots are supported by means of suitable tongs or grippers, suspended from a car or rollers traveling on an overhead track. The pot, held in said tongs, is thrust into the tank, and one edge thereof is gradually submerged in the molten glass by a gentle sweeping motion, so that the glass gradually flows over the edge of the pot and into the same without appreciable fall, and without splashing or stringing, thereby gradually displacing the air from the pot and filling the same with molten glass, and without trapping air bubbles therein. This dipping or ladling step is performed with considerable care and without haste. As soon as the pot is filled with the proper quantity of molten glass, it is quickly withdrawn from the furnace and conveyed along the track, if desired, directly to the casting table, but preferably to a second or tempering furnace, in which the pot with the molten glass contained therein is allowed to remain until the glass has cooled down to the proper working temperature. The pot with the glass therein is then removed and conveyed along the track to the casting table, upon which the glass is poured directly from the pot. This method, if carried out with proper precautions, and with suitable apparatus, can be used to produce perfect plate-glass at much lower cost than according to present methods. The cost of heating and melting down a large quantity of raw materials, in a single tank or furnace, is much less than the cost of melting separate batches in a number of different pots. The material is also handled with a minimum amount of disturbance, there is less chance of breaking the pots, and there is no liability whatever of introducing air bubbles into the molten glass, so that a perfect plate may be made.

In the apparatus shown in the drawings, 1 represents a suitable furnace or tank for heating and melting down the raw materials. Said furnace or tank may be of any type or arrangement, and may contain a separate large tank or vessel for holding the raw materials, but is shown as comprising a hearth 2 of large capacity, in which the glass is melted down.

3 represents flues for conducting the heated gas into and out of the furnace for melting down the raw materials, although any suitable heating means may be provided. One or both sides of the furnace are provided with doors 4, the bottoms of which are just above the level of the molten glass, and which doors are large enough so that the pots may be inserted and removed from the furnace therethrough.

One of the pots, marked "5", is illustrated in Figs. 2, 3 and 4. It is formed of refractory material, such as fire-clay or the like, and its outer wall or rim gradually flares upwardly and outwardly from the flat bottom 6. The outer surface of said pot, intermediate the top and bottom thereof, is provided with a small bead or rib 7, extending entirely around the same. This bead or rib is made as small as possible, so that when the pot is dipped into the molten glass the bead will not drag through the glass and either chill or cool the same, or carry air into the mass. The location of this bead or rib determines the amount of glass which may be scooped up with the pot without submerging any portion of the tongs in the glass, as hereinafter described, which amount increases as the bead or rib is placed nearer the upper edge of the pot. The pot 5 is finished or glazed both on its inner and outer surfaces, so that these will be perfectly smooth and clean and will not pick up or carry dirt or foreign substances into the mass of molten glass.

The pots 5 are always heated gradually in a separate heating furnace, such as the furnace 30, Fig. 9, to bring them up to the temperature of the melting furnace, before being thrust into the same to remove a batch of glass, so as to avoid sudden changes in temperature such as might crack or injure the pots or peel off the glaze therefrom.

The pots are handled by means of suitable tongs or grippers, such as the tongs illustrated in Figs. 2 and 5, and described and claimed in my companion application, filed of even date herewith, Serial No. 757,898. As shown, the tongs comprise a long, heavy bar or rod 8, having one end offset and curved, as at 9, to form a jaw fitting the curved wall of the pot just beneath the bead or rib 7. At or near the point where the jaw 9 is offset from the main body portion of the bar 8, the latter is slotted or split, as at 10, to form an opening through which passes a smaller and shorter arm or lever 11, provided with projections 12 on both sides of the bar 8. The lever 11 and bar 8 may be pivotally connected together, on a suitable pivot pin, although this is not essential. The free end 13 of lever 11 forms a jaw to coöperate with the curved jaw 9, and the distance across said jaws is slightly less than the longer dimension of the oval pot. Moreover, the extreme hooked end or point 14 of the long jaw 9 passes around and beyond the major or longer axis of the oval, so that the pot is grasped over more than half its circumference and thereby prevented from escaping from the tongs. In other words, the ends of both of the jaws 9 and 13 lie on the same side of the longer axis of the pot. The rod or bar 8 may also be provided with a side plate or flange 14, having a series of apertures 15 to receive a pin 16 on the end of a chain 17 secured at its other end to an eye 18 on the outer end of lever 11. By releasing the pin 16, the jaws of the tongs may be opened and placed around the pot and may be then closed thereupon and the short lever or arm secured in the position shown in Fig. 2, by inserting the pin or hook 16 into the proper aperture.

Intermediate its ends the bar or rod 8 is provided with a rigid collar or sleeve 20, having a hook or eye 21 secured thereto, so that the tongs, and the pot held therein, may be suspended by a cable 22 from a car or carrier 23 traveling along an overhead track or runway 24. At its extreme outer end the bar or rod 8 is provided with one or two more cross bars or handles 25, by means of which the pot may be manipulated in the furnace.

In use of the apparatus, to practise the method described, the pots are first heated in the heating furnace 30 to bring them up to the proper temperature. The tongs 8 are then inserted into the furnace and the jaws 13 and 9 clasped around a pot beneath the rib 7. Lever 11 is then tightened up and the pin 16 inserted into the proper aperture 15 to rigidly secure the pot in the tongs. The cross bars or handles 25 are then grasped and the pot withdrawn from the heating oven. The car or carrier 23 is then pushed along the track or runway 24 to bring the tongs into position in front of one of the doors 4. The pot is then passed into the furnace and the handles 25 are manipulated so as to thrust that edge of the pot not embraced by the jaws of the tongs beneath the surface of the molten glass. This is done very carefully, the pot being first tipped to the position shown at $a$, Fig. 6, before being dipped into the glass. It is then gradually moved down into the mass of molten glass with a scooping or sweeping motion, the position of the pot gradually changing, as it passes through the intermediate positions $b$, $c$, $d$ and $e$. This is done slowly so that the glass will flow very quietly and evenly into the pot and gradually displace the air, thereby preventing the liability of air being trapped in the molten glass. The tongs are so arranged that the pot can be dipped into the molten glass without submerging them therein, due to the fact that the curved end 14 of jaw 9, and the end of jaw 13, only pass a short distance beyond the major axis of the oval pot. When the pot has been filled and restored to horizontal position, it is quickly withdrawn from the melting furnace, and the door thereof closed. The carriage 23 is then run along the track 24 to bring the pot with the molten glass contained therein into position in front of the tempering furnace 29. This may be of any ordinary type of furnace, of a size suitable to contain any desired number of pots, and heated in any preferred manner. The bottom of this furnace is provided with a plurality of upstanding projections or pillars 31, having their upper ends of comparatively small size, and spaced so that a glass pot may be rested upon, say three, of said pillars. Before the pot is placed in the heating furnace, a small quantity of clean, pure sand is sprinkled over the tops of the pillars, or they may be provided with a top layer 32 of asbestos or similar refractory material. The pot is placed in position on three of these pillars so that only a very small portion of its bottom surface contacts with a support, thereby preventing the pot from picking up dirt or foreign substances and later on transferring or carrying the same to the molten glass and contaminating the latter.

After the glass has tempered or cooled down to the proper working temperature, it is withdrawn from the tempering furnace with the tongs before described and carried along the track or runway 24 to the table 35 upon which the glass is poured or cast in the usual manner. After the casting or pouring operation, any surplus quantity of glass which may remain in the pot is poured out upon the floor, or into a suitable reserve reservoir, to be melted and used over again. The pot is then returned to the heating furnace, to be withdrawn therefrom and used over again. Pillars or supports similar to the pillars or supports 31 shown in Fig. 7 may also be provided in the furnace 30 for heating the pots, and for the same reason.

The melting furnace 1 is preferably provided with two or more doors 4, so that alternate batches of molten glass can be removed from opposite ends of the furnace, thereby giving the mass of molten glass an opportunity to become homogeneous after it has been partially cooled at one end by a dipping or withdrawing operation. The tongs may also be made in rights and lefts so that the pots can be dipped in either direction.

It will be observed that the method described enables glass to be successfully handled and cast into plates or other articles without danger of contamination of the entire mass with foreign materials. The pots are kept clean throughout the method, and are never set down upon the furnace bottom, as in the usual methods. Moreover, they are finished with a clean glazed surface, both inside and out, so that the molten glass flows readily over the surfaces without friction and without being chilled by the pot, and without liability of air being carried into the molten glass to produce an imperfect plate. The labor cost is greatly reduced, due to the fact that the pots can be carried from place to place by means of the overhead track or runway and can be readily manipulated by only one or two men, and, moreover, are not required to be handled as often as in the usual practice. Moreover, said pots have a much longer life, due to the fact that they are kept at substantially the same temperature for most of the time, and are not withdrawn entirely from the heating furnaces and filled with ingredients in the open air so that they cool down and must be heated again. The pots used in the present method last six months or more, as against one or two months according to old methods. Less heat is also required for melting the large reserve mass of molten glass than when separate batches are melted in open pots.

What I claim is:—

The method of making large sheets of plate glass, consisting in melting down the glass in a furnace of large capacity and thereby forming a large mass of molten glass of uniform characteristics, introducing into said furnace a heated earthenware pot of large capacity and scooping up a solid mass of the molten glass thereinto by submerging one edge of the pot with a scooping motion beneath the surface of the glass, withdrawing the pot from the furnace and introducing the same into a tempering furnace and allowing the pot to remain in said furnace until the glass becomes homogeneous and of even working temperature throughout, transferring the filled pot to a table, and pouring a portion of the glass upon the table.

In testimony whereof, I have hereunto set my hand.

JOHN E. KAPTEINA.

Witnesses:
 ELBERT L. HYDE,
 WILLIAM B. WHARTON.